United States Patent
Shih et al.

(10) Patent No.: US 10,436,954 B2
(45) Date of Patent: Oct. 8, 2019

(54) CAMERA DEVICE

(71) Applicants: Sintai Optical (Shenzhen) Co., Ltd., Shenzhen, Guangdong Province (CN); Asia Optical Co., Inc., Taichung (TW)

(72) Inventors: Ming-Wei Shih, Taichung (TW); Hsi-Ling Chang, Taichung (TW); Chien-Hung Chen, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/822,406

(22) Filed: Nov. 27, 2017

(65) Prior Publication Data
US 2019/0041554 A1    Feb. 7, 2019

(30) Foreign Application Priority Data
Aug. 2, 2017  (TW) .............................. 106126040 A

(51) Int. Cl.
G02B 5/00    (2006.01)
G02B 13/00   (2006.01)
G02B 1/04    (2006.01)

(52) U.S. Cl.
CPC .......... G02B 5/005 (2013.01); G02B 13/0055 (2013.01); G02B 1/04 (2013.01)

(58) Field of Classification Search
CPC ................................ G02B 5/005; G02B 5/006
(Continued)

(56) References Cited

U.S. PATENT DOCUMENTS 4,047,807 A * 9/1977 Okano .................... G03B 9/06
                                                        348/362
5,648,877 A * 7/1997 Schnitzlein ............ G02B 5/005
                                                        359/739
(Continued)

FOREIGN PATENT DOCUMENTS

CN    205643983 U    10/2016
JP    2002258132 A    9/2002
(Continued)

OTHER PUBLICATIONS

TW Office Action dated Dec. 11, 2017 in corresponding Taiwan application (No. 106126040).
(Continued)

*Primary Examiner* — Darryl J Collins
(74) *Attorney, Agent, or Firm* — McClure, Qualey & Rodack, LLP

(57) ABSTRACT

A camera device includes a plurality of lenses and an annular body. The annular body is disposed between the object side and the plurality of lenses, between the plurality of lenses, or between the plurality of lenses and the image side. The annular body includes an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form a hole. The camera device satisfies: $Dx>Dy$, $1<Dx/Dy<28$, where $Dx$ is a maximum dimension of the hole through which the optical axis passes, and $Dy$ is a minimum dimension of the hole through which the optical axis passes.

16 Claims, 13 Drawing Sheets

(58) Field of Classification Search
USPC .......................................... 359/738–740, 601
See application file for complete search history.

(56) References Cited

U.S. PATENT DOCUMENTS

| | | | |
|---|---|---|---|
| 6,538,827 B2 | 3/2003 | Bos | |
| 6,556,361 B1 | 4/2003 | Smith et al. | |
| 7,414,665 B2* | 8/2008 | Watanabe | G02B 15/177 |
| | | | 348/240.3 |
| 8,837,060 B2* | 9/2014 | Lin | G02B 13/0085 |
| | | | 359/715 |
| 9,341,813 B1* | 5/2016 | Lin | G02B 9/04 |
| 2001/0003480 A1 | 6/2001 | Ryuk et al. | |
| 2005/0031338 A1 | 2/2005 | Koyama et al. | |
| 2007/0053077 A1* | 3/2007 | Lin | G02B 5/005 |
| | | | 359/738 |
| 2007/0092246 A1 | 4/2007 | Aoki et al. | |
| 2009/0303617 A1* | 12/2009 | Chang | G02B 5/005 |
| | | | 359/739 |
| 2011/0267696 A1* | 11/2011 | Tsuji | G02B 5/005 |
| | | | 359/601 |
| 2013/0329026 A1* | 12/2013 | Hida | A61B 1/04 |
| | | | 348/65 |
| 2014/0016216 A1 | 1/2014 | Mori et al. | |
| 2015/0346470 A1 | 12/2015 | Sugiyama | |
| 2018/0095235 A1* | 4/2018 | Chang | G02B 7/021 |

FOREIGN PATENT DOCUMENTS

| | | |
|---|---|---|
| JP | 200488181 A | 3/2004 |
| TW | 200728791 A | 8/2007 |
| TW | 201303406 A | 1/2013 |
| TW | 201416700 A | 5/2014 |

OTHER PUBLICATIONS

English translation of TW Office Action dated Dec. 11, 2017 in corresponding Taiwan application (No. 106126040).

* cited by examiner

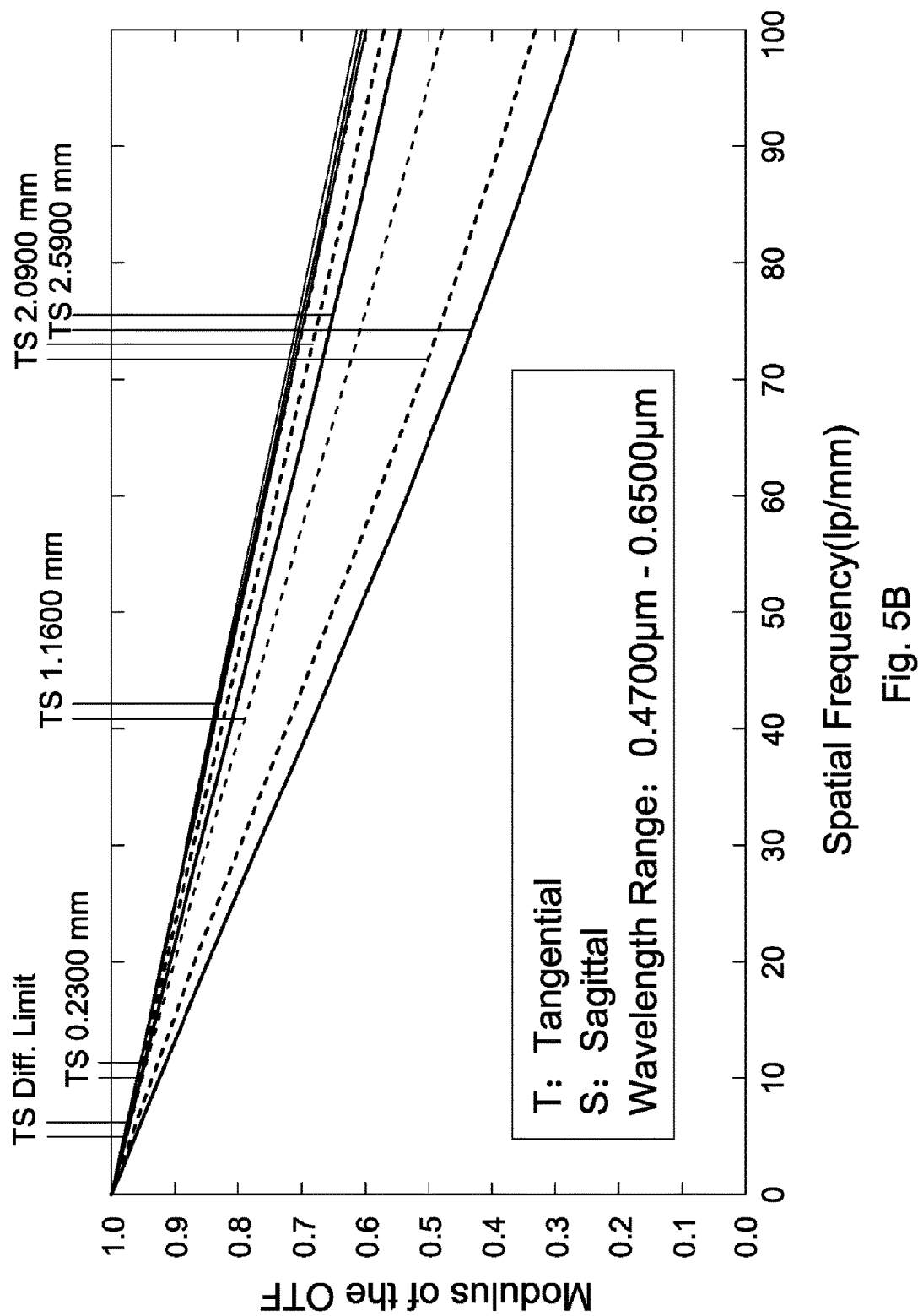

CAMERA DEVICE

BACKGROUND OF THE INVENTION

Field of the Invention

The invention relates to a camera device.

Description of the Related Art

FIG. 1 shows a well known aperture of a lens assembly for a mobile phone, wherein the aperture 10 includes an annular body 11 which includes an annular main body 111, an outer circumferential portion 112 and an inner circumferential portion 113. The outer circumferential portion 112 is circular and the hollow region surrounded by the inner circumferential portion 113 is also circular. A well known periscopic lens assembly is featured with a shortened total length. However, if an aperture shaped like that shown in FIG. 1 is included in a periscopic lens assembly, then thinning the periscopic lens assembly and a mobile phone containing the periscopic lens assembly become difficult. Further, mobile phones have been developed toward miniaturization. Therefore, the periscopic lens assemblies used for mobile phones also need to be developed toward miniaturization. In addition, a general lens assembly used for some special applications has the same requirement (miniaturization). Therefore, the invention provides an aperture for general lens assemblies and/or periscopic lens assemblies, which is not circularly symmetrical for reducing the thickness of the lens assembly.

BRIEF SUMMARY OF THE INVENTION

The invention provides a camera device to solve the above problem. The camera device of the invention includes an annual body which is provided with a non-circular region for light rays to pass through. By such arrangement, the thickness of the camera device can be reduced if the camera device includes a general lens assembly or a periscopic lens assembly.

The camera device in accordance with an exemplary embodiment of the invention includes a plurality of lenses and an annular body. The plurality of lenses and the annular body are arranged between an object side and an image side along an optical axis. The annular body is disposed between the object side and the plurality of lenses, between the plurality of lenses, or between the plurality of lenses and the image side. The annular body includes an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion is non-circular and surrounds the optical axis to form a hole. The camera device satisfies: Dx>Dy, 1<Dx/Dy<28, wherein Dx is a maximum dimension of the hole through which the optical axis passes, and Dy is a minimum dimension of the hole through which the optical axis passes.

In another exemplary embodiment, the camera device satisfies: 0<(Dx−Dy)/(Dx/2)<2.

In yet another exemplary embodiment, the camera device further includes a reflection device disposed between the object side and the plurality of lenses.

In another exemplary embodiment, the reflection device is a prism or a reflection mirror.

In yet another exemplary embodiment, the camera device satisfies: 0<ΔS/(Dx/2)<8, wherein ΔS is a difference between an area of a circle having a diameter of Dx and a cross sectional area of the hole.

In another exemplary embodiment, the camera device satisfies: 0<($A_x$ΔS)/$A_x$<1, where $A_x$ is an area of a circle having a diameter of Dx and ΔS is a difference between the area of the circle having the diameter of Dx and a cross sectional area of the hole.

In yet another exemplary embodiment, the outer circumferential portion is non-circular.

In another exemplary embodiment, the annular body is made of metal or polyethylene terephthalate (PET).

In yet another exemplary embodiment, the annular body is manufactured by atomizing, blacking, or printing a non-effective-diameter region on one of the lenses.

The camera device in accordance with another exemplary embodiment of the invention includes a plurality of lenses. At least one of the lenses includes an annular shade. The annular shade includes an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion forms a hole. The camera device satisfies: 0<($A_x$−ΔS)/$A_x$<1, where Ax is an area of a circle having a diameter of Dx, Dx is a maximum dimension of the hole through which an optical axis passes, and S is a difference between the area of the circle having the diameter of Dx and a cross sectional area of the hole.

In yet another exemplary embodiment, the camera device satisfies: 0<ΔS(Dx/2)<8.

In another exemplary embodiment, the outer circumferential portion is non-circular.

In yet another exemplary embodiment, the camera device satisfies: 0<($A_x$ΔS)/$A_x$<1, where $A_x$ is an area of a circle having a diameter of Dx.

In another exemplary embodiment, the outer circumferential portion is non-circular.

In yet another exemplary embodiment, the outer circumferential portion includes at least one straight edge.

In another exemplary embodiment, the outer circumferential portion is polygonal.

In yet another exemplary embodiment, the inner circumferential portion includes at least one straight edge.

In another exemplary embodiment, the inner circumferential portion is polygonal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5B is a modulation transfer function diagram of the camera device in Table 3 when F-number is equal to 5.45;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
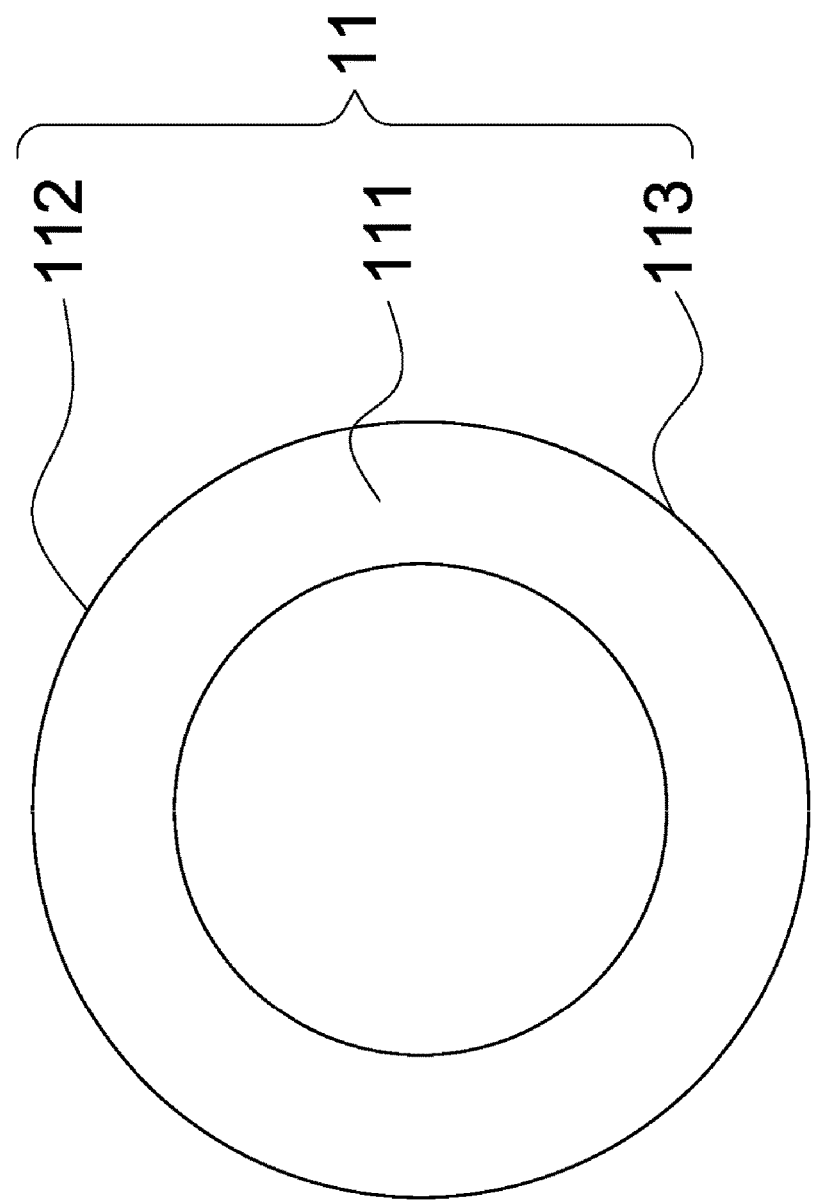
FIG. 1 is a diagram of the well known aperture.
Figure 2:
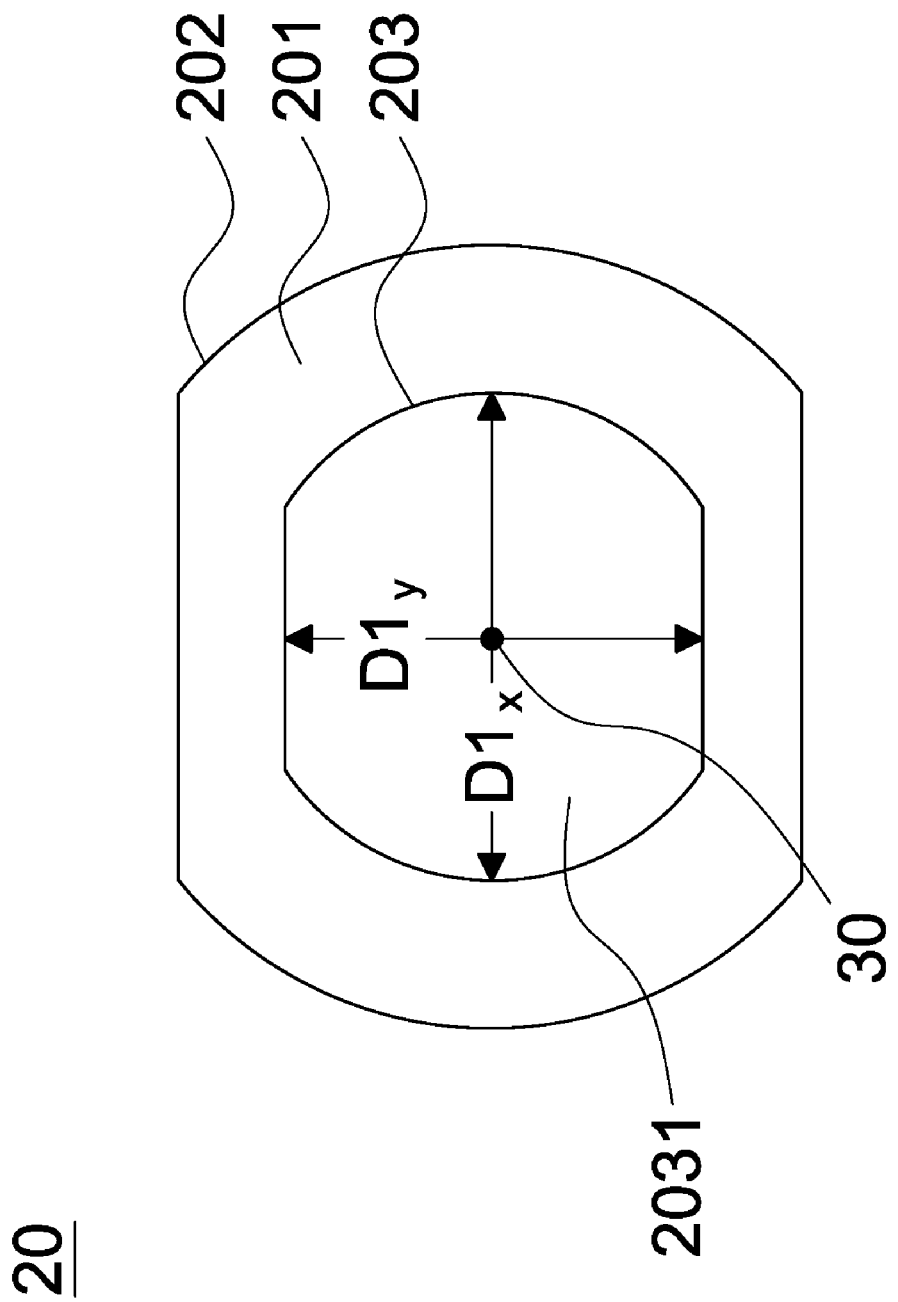
FIG. 2 depicts an annular body of a camera device in accordance with a first embodiment of the invention.

As shown in FIG. 2, a camera device (not shown) in a first embodiment includes a plurality of lenses (not shown) and an annular body 20, which are arranged between an object side (not shown) and an image side (not shown) along an optical axis 30. The annular body can be regarded as an annular shade, which will not be repeatedly emphasized hereinafter. The annular body 20 is disposed between the object side (not shown) and the plurality of lenses (not shown). The annular body 20 includes an annular main body 201, an outer circumferential portion 202, and an inner circumferential portion 203. The outer circumferential portion 202 and the inner circumferential portion 203 include two straight edges and two arcuate edges respectively. The annular main body 201 connects to the outer circumferential portion 202 and the inner circumferential portion 203. The annular main body 201 is disposed between the outer circumferential portion 202 and the inner circumferential portion 203. The inner circumferential portion 203 is shaped like an oak barrel (non-circular) and surrounds the optical axis 30 to form a hole 2031. $D1x$ is a maximum dimension of the hole 2031 defined by the inner circumferential portion 203 through which the optical axis 30 passes and $D1y$ is a minimum dimension of the hole 2031 defined by the inner circumferential portion 203 through which the optical axis 30 passes. The hole 2031 allows the light rays from the object side (not shown) to pass through, and its dimension will affect the amount of the light rays passing through the camera device (not shown). Therefore, the main purpose of the annular body 20 is to work as an aperture. When the maximum dimension $D1x$ of the hole 2031 is fixed, the annular body 20 will be flatter if the minimum dimension $D1y$ which is smaller than the maximum dimension $D1x$ is reduced. Therefore, if the flattened annular body 20 is included in a general lens assembly or a periscopic lens assembly, then the thickness of the lens assembly can be effectively reduced.

The F-number of a camera device is equal to the effective focal length (f) divided by the entrance pupil diameter (D), and the mathematical equation can be represented by F-number=f/D. Since the entrance pupil area A is equal to $\pi \times (D/2)^2$, F-number=f/D can be rewritten as F-number=f/$2\times(\pi/A)^{1/2}$. Therefore, the larger the entrance pupil area A, the smaller the F-number when the effective focal length (f) of the camera device is the same.

Table 1 shows data for the camera device of the first embodiment of the invention, wherein f is fixed to 15 mm, $D1x$ is fixed to 5.55 mm, and $A1_x$ is fixed to 24.1799625 mm², f is an effective focal length of the camera device (not shown), $D1x$ is a maximum dimension of the hole 2031 defined by the inner circumferential portion 203 through which the optical axis 30 passes, $D1y$ is a minimum dimension of the hole 2031 defined by the inner circumferential portion 203 through which the optical axis 30 passes, $A1_x$ is an area of a circle having a diameter of $D1x$ and $\Delta S1$ is a difference between the area of the circle having the diameter of $D1x$ and a cross sectional area of the hole 2031. If $D1y$ ranges from 5.55 mm to 0.5 mm, then F-number ranges from 2.70 to 8.38, $D1x/D1y$ ranges from 1.0 to 11.1, $(D1x-D1y)/(D1x/2)$ ranges from 0.0 to 1.81981982, $\Delta S1/(D1x/2)$ ranges from 0.0 mm to 7.808527027 mm, and $(A1_x-\Delta S1)/A1_x$ ranges from 1.0 to 0.103858722.

TABLE 1

Effective focal Length = 15 mm
D1x = 5.55 mm
$A1_x$ = 24.1799625 mm²

| D1y (mm) | D1x/D1y | (D1x − D1y)/(D1x/2) | Hole Area (mm²) | Δ S1 (mm²) | Δ S1/(D1x/2) (mm) | (A1$_x$ − Δ S1)/A1$_x$ | F-number |
|---|---|---|---|---|---|---|---|
| 5.55 | 1.0 | 0.0 | 24.1799625 | 0.0 | 0.0 | 1.0 | 2.70 |
| 5 | 1.11 | 0.198198198 | 23.2998 | 0.8801625 | 0.317175676 | 0.963599509 | 2.75 |
| 4.44 | 1.25 | 0.4 | 21.6741 | 2.5058625 | 0.903013514 | 0.896366154 | 2.85 |
| 4 | 1.3875 | 0.558558559 | 20.0904 | 4.0895625 | 1.473716216 | 0.830869775 | 2.96 |
| 2 | 2.775 | 1.279279279 | 10.05 | 14.1299625 | 5.091878378 | 0.415633399 | 4.19 |
| 1.33 | 4.172932331 | 1.520720721 | 6.67 | 17.5099625 | 6.309896396 | 0.275848236 | 5.14 |
| 1 | 5.55 | 1.63963964 | 5.02 | 19.1599625 | 6.904490991 | 0.207609917 | 5.93 |
| 0.8 | 6.9375 | 1.711711712 | 4.02 | 20.1599625 | 7.264851351 | 0.16625336 | 6.62 |
| 0.67 | 8.28358209 | 1.758558559 | 3.35 | 20.8299625 | 7.506292793 | 0.138544466 | 7.26 |
| 0.57 | 9.736842105 | 1.794594595 | 2.87 | 21.3099625 | 7.679265766 | 0.118693319 | 7.84 |
| 0.5 | 11.1 | 1.81981982 | 2.5113 | 21.6686625 | 7.808527027 | 0.103858722 | 8.38 |

D1x: a maximum dimension of the hole 2031 through which the optical axis 30 passes
D1y: a minimum dimension of the hole 2031 through which the optical axis 30 passes
A1$_x$: an area of a circle having a diameter of D1x
Δ S1: a difference between the area of the circle having the diameter of D1x and a cross sectional area of the hole 2031

Figure 3A:
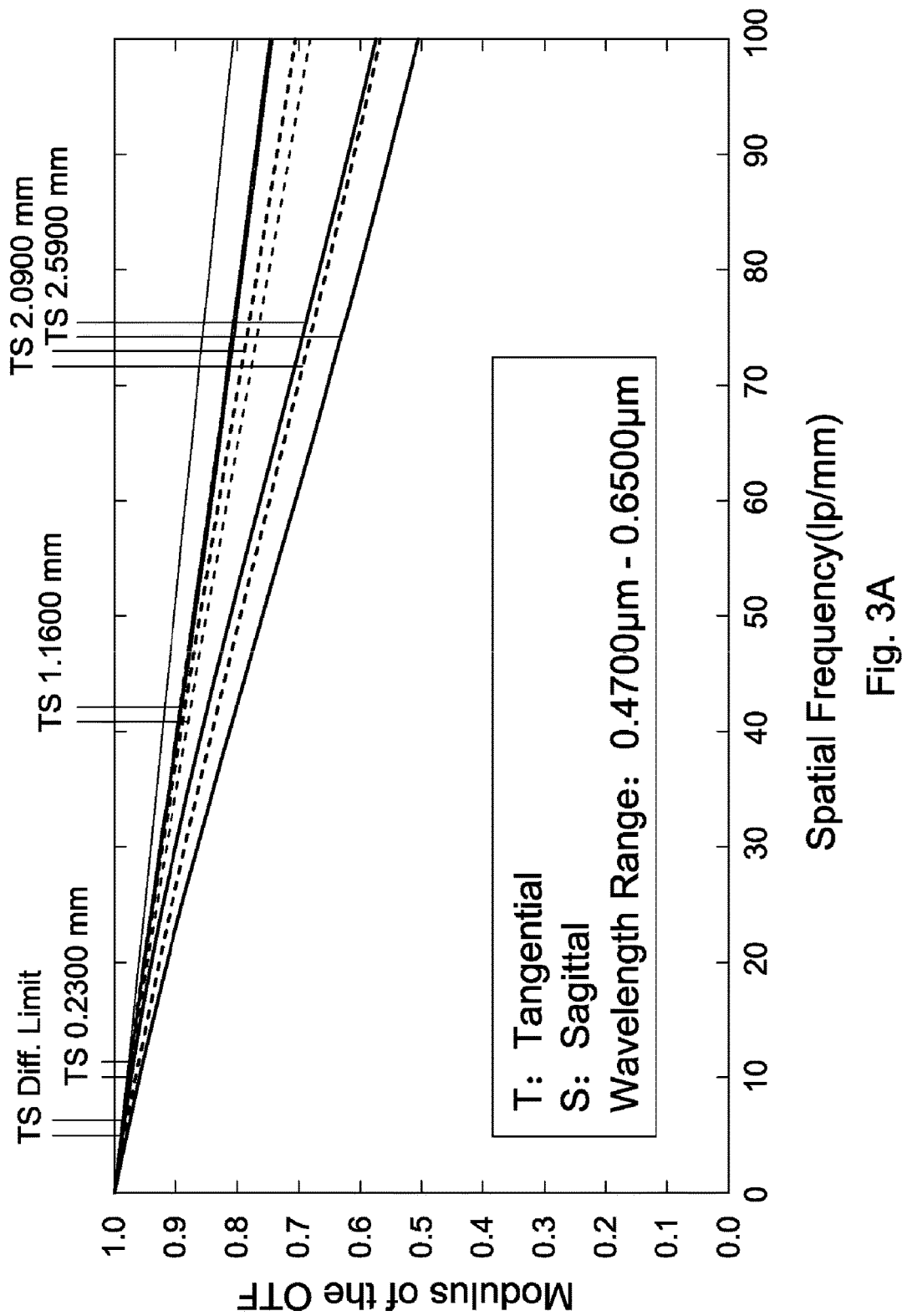
FIG. 3A is a modulation transfer function diagram of the camera device in Table 1 when F-number is equal to 2.70.
Figure 3B:
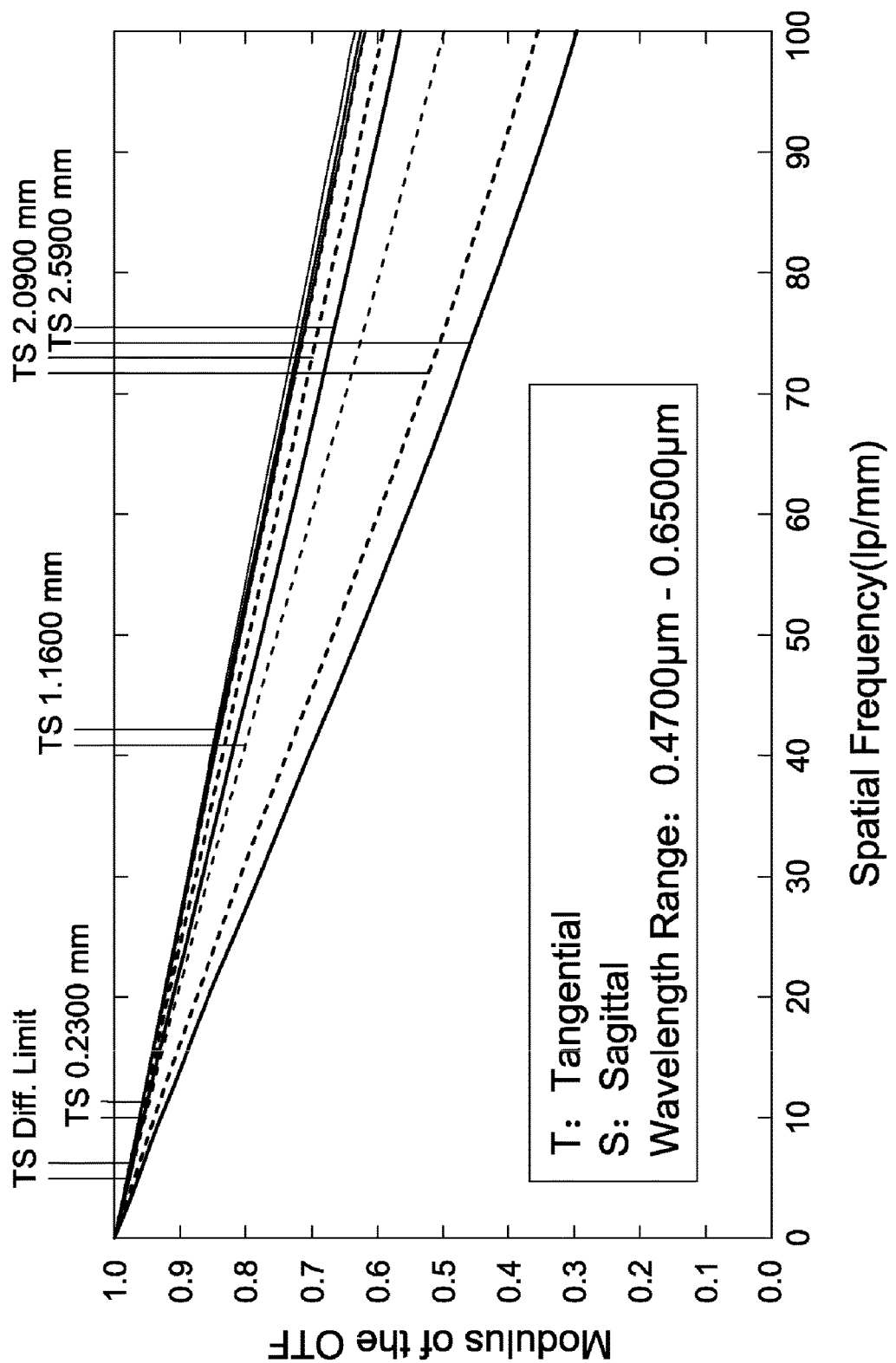
FIG. 3B is a modulation transfer function diagram of the camera device in Table 1 when F-number is equal to 5.14.
Figure 3C:
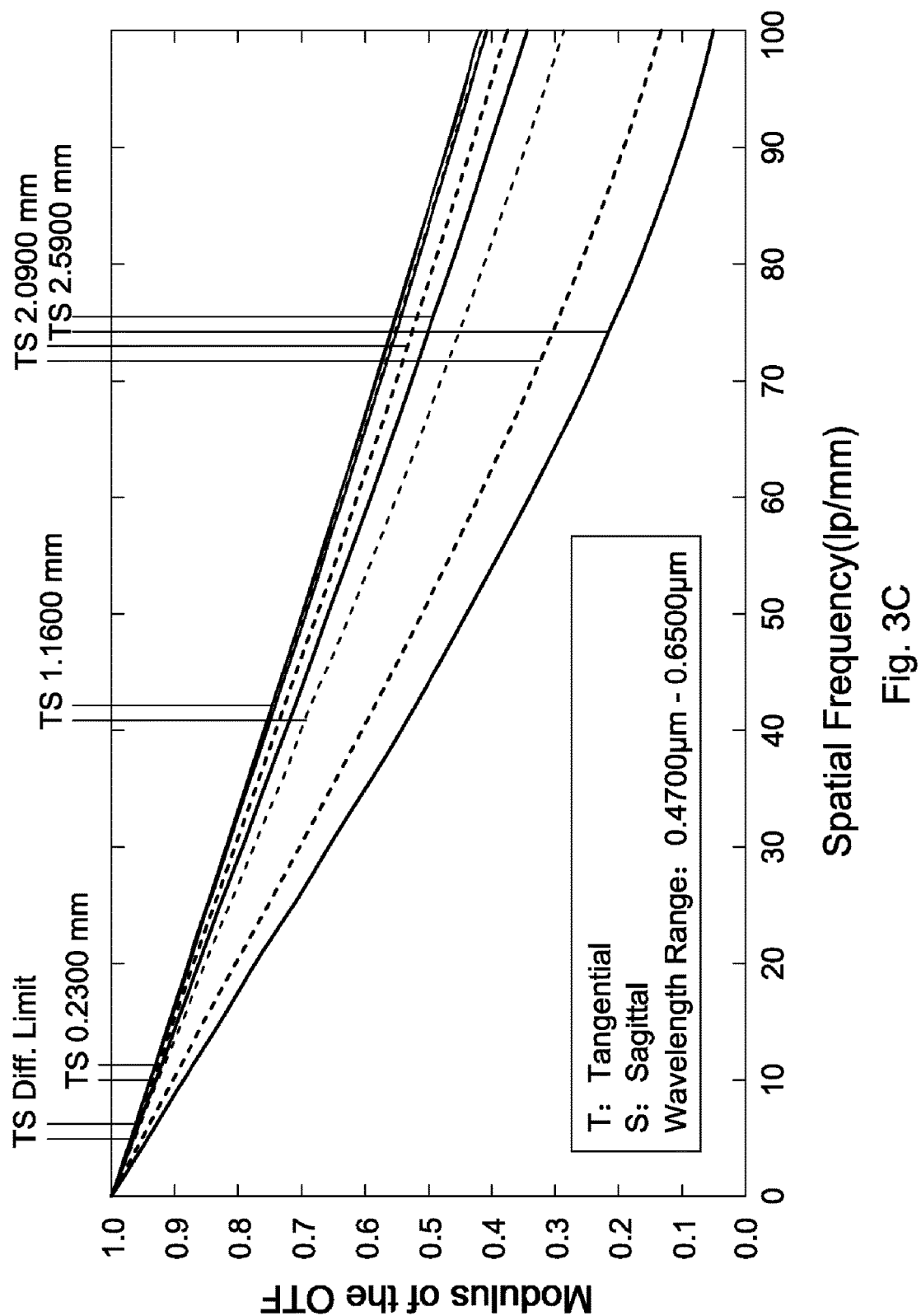
FIG. 3C is a modulation transfer function diagram of the camera device in Table 1 when F-number is equal to 8.38.

FIG. 3A shows the modulation transfer function diagram of the camera device in Table 1 when F-number is equal to 2.70. FIG. 3B shows the modulation transfer function diagram of the camera device in Table 1 when F-number is equal to 5.14. FIG. 3C shows the modulation transfer function diagram of the camera device in Table 1 when F-number is equal to 8.38.

Table 2 shows other data for the camera device of the first embodiment of the invention, wherein f is fixed to 5.09389 mm, D1$x$ is fixed to 3.0872 mm, and A1$_x$ is fixed to 7.481681014 mm$^2$. If D1$y$ ranges from 3.0872 mm to 0.112 mm, then F-number ranges from 1.65 to 8.07, D1$x$/D1$y$ ranges from 1.0 to 27.56428751, (D1$x$–D1$y$)/(D1$x$/2) ranges from 0.0 to 1.927442343, ΔS1/(D1$x$/2) ranges from 0.0 mm to 4.644779097 mm, and (A1$_x$–ΔS1)/A1$_x$ ranges from 1.0 to 0.041701858.

circumferential portion 403. The inner circumferential portion 403 is hexagonal (non-circular) and surrounds the optical axis 50 to form a hole 4031. D2$x$ is a maximum dimension of the hole 4031 defined by the inner circumferential portion 403 through which the optical axis 50 passes and D2$y$ is a minimum dimension of the hole 4031 defined by the inner circumferential portion 403 through which the optical axis 50 passes. The hole 4031 allows the light rays from the object side (not shown) to pass through, and its dimension will affect the amount of the light rays passing through the camera device (not shown). Therefore, the main purpose of the annular body 40 is to work as an aperture. When the maximum dimension D2$x$ of the hole 4031 is fixed, the annular body 40 will be flatter if the minimum dimension D2$y$ which is smaller than the maximum dimension D2$x$ is reduced. Therefore, if the flattened annular body

TABLE 2

Effective focal Length = 5.09389 mm
D1x = 3.0872 mm
A1$_x$ = 7.481681014 mm$^2$

| D1y (mm) | D1x/D1y | (D1x − D1y)/(D1x/2) | Hole Area (mm$^2$) | Δ S1 (mm$^2$) | Δ S1/(D1x/2) (mm) | (A1$_x$ − Δ S1)/A1$_x$ | F-number |
|---|---|---|---|---|---|---|---|
| 3.0872 | 1.0 | 0.0 | 7.481681014 | 0.0 | 0.0 | 1.0 | 1.65 |
| 2.234 | 1.381915846 | 0.552733869 | 6.268 | 1.213681014 | 0.786266529 | 0.837779636 | 1.80 |
| 1.11 | 2.781261261 | 1.280901788 | 3.11 | 4.371681014 | 2.832133334 | 0.415681983 | 2.55 |
| 0.744 | 4.149462366 | 1.518009847 | 2.088 | 5.393681014 | 3.494221958 | 0.279081666 | 3.12 |
| 0.56 | 5.512857143 | 1.637211713 | 1.56 | 5.921681014 | 3.836279486 | 0.20850929 | 3.61 |
| 0.44 | 7.016363636 | 1.71495206 | 1.24 | 6.241681014 | 4.043587079 | 0.165738154 | 4.05 |
| 0.372 | 8.298924731 | 1.759004924 | 1.044 | 6.437681014 | 4.170562979 | 0.139540833 | 4.41 |
| 0.32 | 9.6475 | 1.792692407 | 0.892 | 6.589681014 | 4.269034086 | 0.119224543 | 4.77 |
| 0.278 | 11.10503597 | 1.819901529 | 0.78 | 6.701681014 | 4.341591743 | 0.104254645 | 5.11 |
| 0.248 | 12.4483871 | 1.839336616 | 0.696 | 6.785681014 | 4.396009986 | 0.093027222 | 5.40 |
| 0.22 | 14.03272727 | 1.85747603 | 0.6 | 6.881681014 | 4.458202264 | 0.080195881 | 5.82 |
| 0.148 | 20.85945946 | 1.904120238 | 0.416 | 7.065681014 | 4.57740413 | 0.055602477 | 6.99 |
| 0.112 | 27.56428571 | 1.927442343 | 0.312 | 7.169681014 | 4.644779097 | 0.041701858 | 8.07 |

D1x: a maximum dimension of the hole 2031 through which the optical axis 30 passes
D1y: a minimum dimension of the hole 2031 through which the optical axis 30 passes
A1$_x$: an area of a circle having a diameter of D1x
Δ S1: a difference between the area of the circle having the diameter of D1x and a cross sectional area of the hole 2031

The modulation transfer function diagram of the camera device at different F-numbers in Table 2 is similar to in Table 1, so the illustration is omitted.

Figure 4:
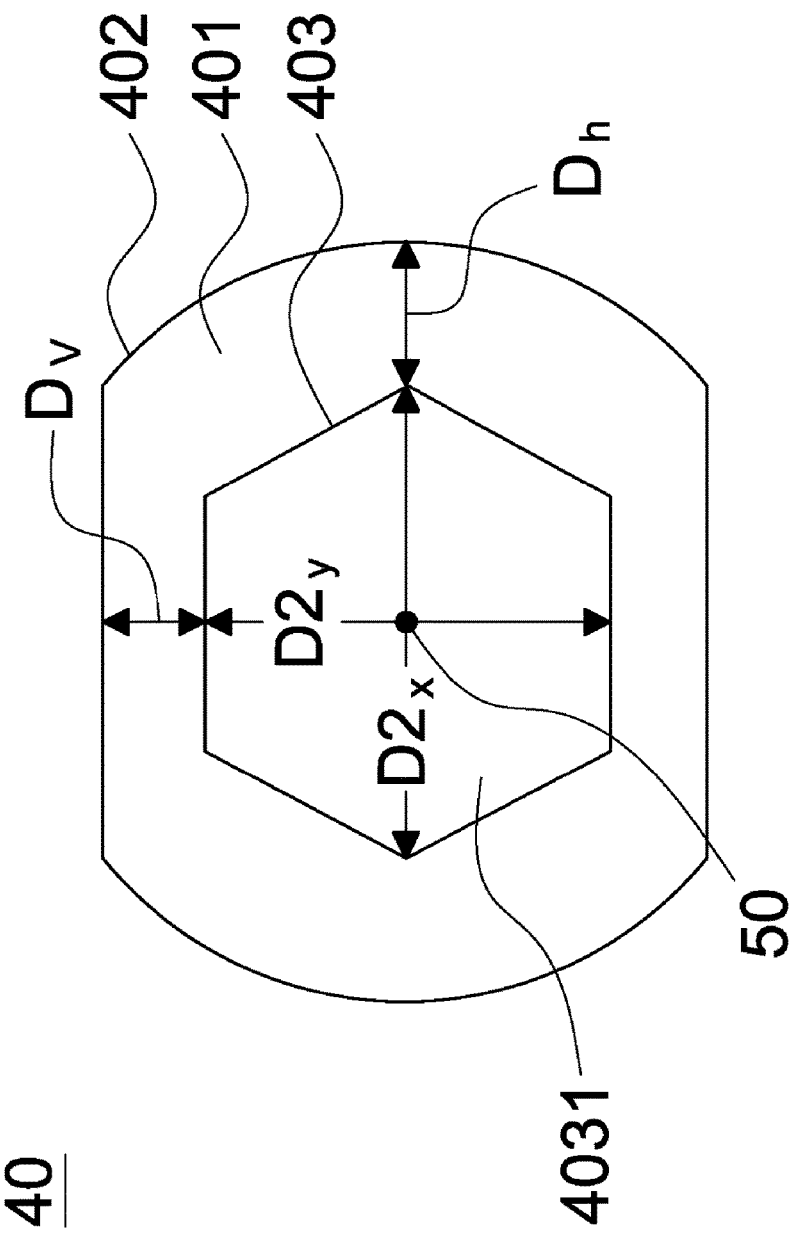
FIG. 4 is an annular body diagram of a camera device in accordance with a second embodiment of the invention.

As shown in FIG. 4, a camera device (not shown) in a second embodiment includes a plurality of lenses (not shown) and an annular body 40, which are arranged between an object side (not shown) and an image side (not shown) along an optical axis 50. The annular body 40 can be regarded as an annular shade, which will not be repeatedly emphasized hereinafter. The annular body 40 is disposed between the object side (not shown) and the plurality of lenses (not shown). The annular body 40 includes an annular main body 401, an outer circumferential portion 402, and an inner circumferential portion 403. The outer circumferential portion 402 includes two straight edges and two arcuate edges. The inner circumferential portion 403 includes six straight edges. The annular main body 401 connects to the outer circumferential portion 402 and the inner circumferential portion 403. The annular main body 401 is disposed between the outer circumferential portion 402 and the inner circumferential portion 403. The inner circumferential portion 403 is hexagonal (non-circular) and surrounds the optical axis 50 to form a hole 4031. D2$x$ is a maximum dimension of the hole 4031 defined by the inner circumferential portion 403 through which the optical axis 50 passes.

40 is included in a general lens assembly or a periscopic lens assembly, then the thickness of the lens assembly can be effectively reduced.

Table 3 shows data for the camera device of the second embodiment of the invention, wherein f is fixed to 15 mm, D2$x$ is fixed to 5.55 mm, A2$_x$ is fixed to 24.1799625 mm$^2$, f is an effective focal length of the camera device (not shown), D2$x$ is a maximum dimension of the hole 4031 defined by the inner circumferential portion 403 through which the optical axis 50 passes, D2$y$ is a minimum dimension of the hole 4031 defined by the inner circumferential portion 403 through which the optical axis 50 passes, A2$_x$ is an area of a circle having a diameter of D2$x$ and ΔS2 is a difference between the area of the circle having the diameter of D2$x$ and a cross sectional area of the hole 4031. If D2$y$ ranges from 5.55 mm to 0.5 mm, then F-number ranges from 2.76 to 8.85, D2$x$/D2$y$ ranges from 1.0 to 11.1, (D2$x$–D2$y$)/(D2$x$/2) ranges from 0.0 to 1.81981982, ΔS2/(D2$x$/2) ranges from 0.388490991 mm to 7.902328829 mm, and (A2$_x$–ΔS2)/A2$_x$ ranges from 0.955415047 to 0.09309361.

TABLE 3

Effective focal Length = 15 mm
D2x = 5.55 mm
A2$_x$ = 24.1799625 mm$^2$

| D2y (mm) | D2x/D2y | (D2x − D2y)/(D2x/2) | Hole Area (mm$^2$) | Δ S2 (mm$^2$) | Δ S2/(D2x/2) (mm) | (A2$_x$ − Δ S2)/A2$_x$ | F-number |
|---|---|---|---|---|---|---|---|
| 5.55 | 1.0 | 0.0 | 23.1019 | 1.0780625 | 0.388490991 | 0.955415047 | 2.76 |
| 5 | 1.11 | 0.198198198 | 21.5 | 2.6799625 | 0.965752252 | 0.889165978 | 2.86 |
| 4.44 | 1.25 | 0.4 | 19.7136 | 4.4663625 | 1.6095 | 0.815286624 | 2.99 |
| 4 | 1.3875 | 0.558558559 | 18.2 | 5.9799625 | 2.154941441 | 0.752689339 | 3.11 |
| 2 | 2.775 | 1.279279279 | 9.103 | 15.0769625 | 5.43313964 | 0.376468739 | 4.40 |
| 1.33 | 4.172932331 | 1.520720721 | 5.935 | 18.2449625 | 6.574761261 | 0.245451166 | 5.45 |
| 1 | 5.55 | 1.63963964 | 4.5224 | 19.6575625 | 7.083806306 | 0.187030894 | 6.24 |
| 0.8 | 6.9375 | 1.711711712 | 3.6945 | 20.4854625 | 7.382148649 | 0.1527918 | 6.91 |
| 0.67 | 8.28358209 | 1.758558559 | 2.9813 | 21.1986625 | 7.639157658 | 0.123296304 | 7.69 |
| 0.57 | 9.736842105 | 1.794594595 | 2.576 | 21.6039625 | 7.785211712 | 0.106534491 | 8.28 |
| 0.5 | 11.1 | 1.81981982 | 2.251 | 21.9289625 | 7.902328829 | 0.09309361 | 8.85 |

D2x: a maximum dimension of the hole 4031 through which the optical axis 50 passes
D2y: a minimum dimension of the hole 4031 through which the optical axis 50 passes
A2$_x$: an area of a circle having a diameter of D2x
Δ S2: a difference between the area of the circle having the diameter of D2x and a cross sectional area of the hole 4031

Figure 5A:
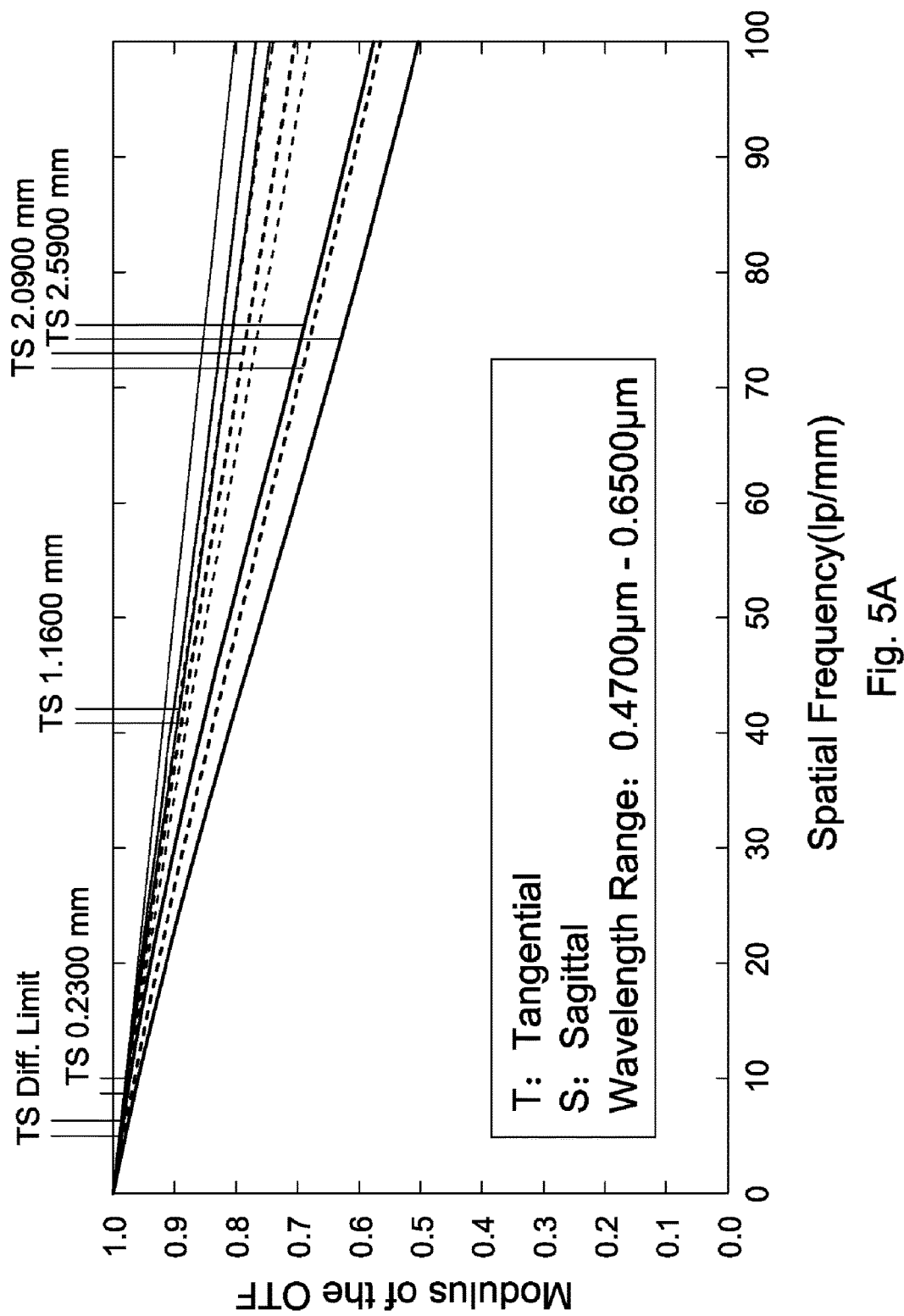
FIG. 5A is a modulation transfer function diagram of the camera device in Table 3 when F-number is equal to 2.76.
Figure 5C:
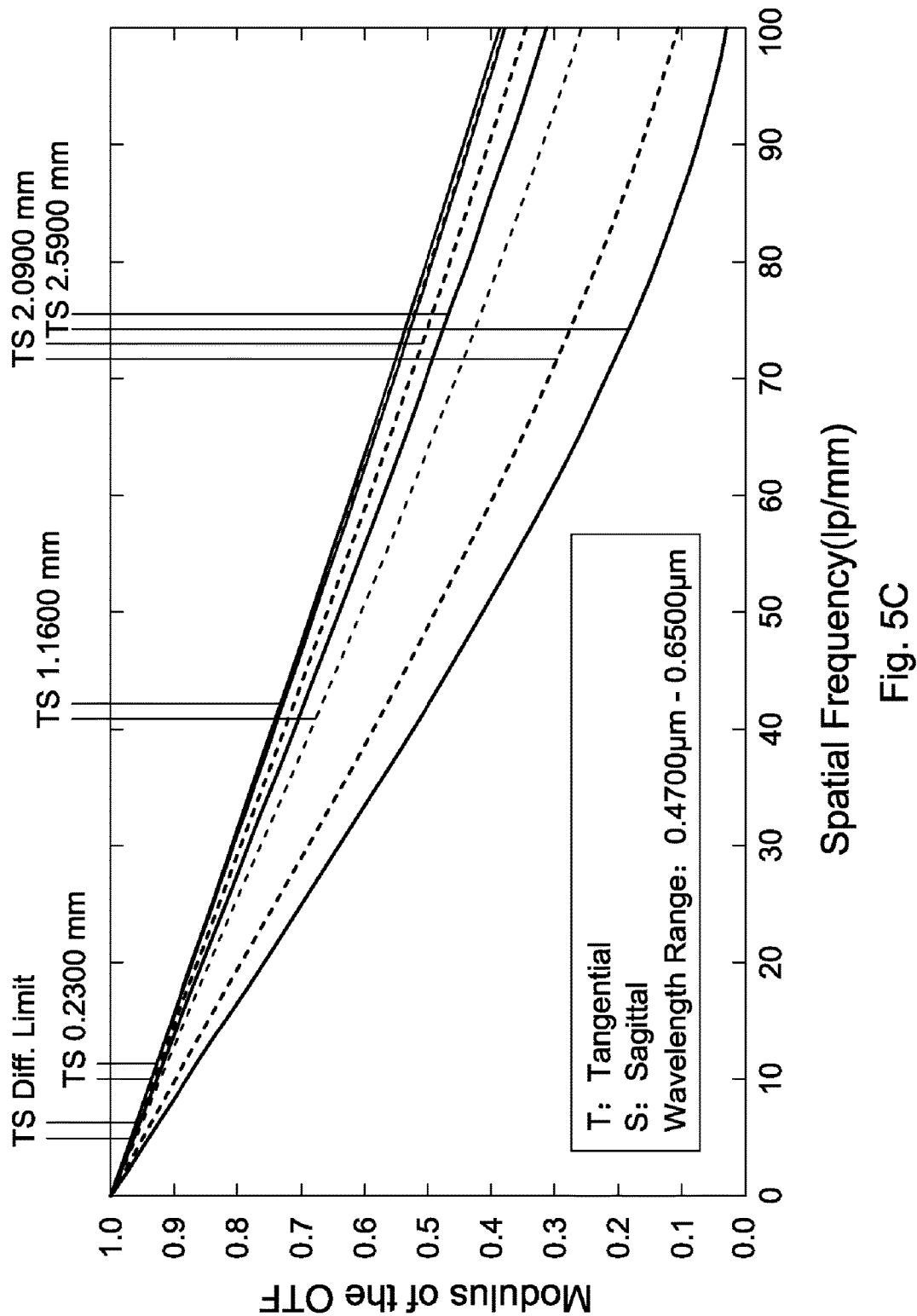
FIG. 5C is a modulation transfer function diagram of the camera device in Table 3 when F-number is equal to 8.85.

FIG. 5A shows the modulation transfer function diagram of the camera device in Table 3 when F-number is equal to 2.76. FIG. 5B shows the modulation transfer function diagram of the camera device in Table 3 when F-number is equal to 5.45. FIG. 5C shows the modulation transfer function diagram of the camera device in Table 3 when F-number is equal to 8.85.

Table 4 shows other data for the camera device of the second embodiment of the invention, wherein f is fixed to 5.09389 mm, D2x is fixed to 3.0872 mm, and A2$_x$ is fixed to 7.481681014 mm$^2$. If D2y ranges from 3.0872 mm to 0.112 mm, then F-number ranges from 1.68 to 8.86, D2x/D2y ranges from 1.0 to 27.56428751, (D2x−D2y)/(D2x/2) ranges from 0.0 to 1.927442343, ΔS2/(D2x/2) ranges from 0.216170649 mm to 4.678920066 mm, and (A2$_x$−ΔS2)/A2$_x$ ranges from 0.955400262 to 0.034657987.

TABLE 4

Effective focal Length = 5.09389 mm
D2x = 3.0872 mm
A2$_x$ = 7.481681014 mm$^2$

| D2y (mm) | D2x/D2y | (D2x − D2y)/(D2x/2) | Hole Area (mm$^2$) | Δ S2 (mm$^2$) | Δ S2/(D2x/2) (mm) | (A2$_x$ − Δ S2)/A2$_x$ | F-number |
|---|---|---|---|---|---|---|---|
| 3.0872 | 1.0 | 0.0 | 7.148 | 0.333681014 | 0.216170649 | 0.955400262 | 1.68 |
| 2.234 | 1.381915846 | 0.552733869 | 5.1726 | 2.309081014 | 1.495906332 | 0.69136869 | 1.98 |
| 1.11 | 2.781261261 | 1.280901788 | 2.57 | 4.911681014 | 3.181964897 | 0.34350569 | 2.81 |
| 0.744 | 4.149462366 | 1.518009847 | 1.722 | 5.759681014 | 3.731330017 | 0.230162178 | 3.43 |
| 0.56 | 5.512857143 | 1.637211713 | 1.296 | 6.185681014 | 4.00730825 | 0.173223103 | 3.96 |
| 0.44 | 7.016363636 | 1.71495206 | 1.018 | 6.463681014 | 4.187406721 | 0.136065678 | 4.47 |
| 0.372 | 8.298924731 | 1.759004924 | 0.861 | 6.620681014 | 4.289117009 | 0.115081089 | 4.86 |
| 0.32 | 9.6475 | 1.792692407 | 0.741 | 6.740681014 | 4.366857356 | 0.099041913 | 5.24 |
| 0.278 | 11.10503597 | 1.819901529 | 0.643 | 6.838681014 | 4.430345306 | 0.085943252 | 5.62 |
| 0.248 | 12.4483871 | 1.839336616 | 0.574 | 6.907681014 | 4.475046006 | 0.076720726 | 5.95 |
| 0.22 | 14.03272727 | 1.85747603 | 0.509 | 6.972681014 | 4.51715536 | 0.068032839 | 6.32 |
| 0.148 | 20.85945946 | 1.904120238 | 0.3426 | 7.139081014 | 4.624955309 | 0.045791848 | 7.71 |
| 0.112 | 27.56428571 | 1.927442343 | 0.2593 | 7.222381014 | 4.678920066 | 0.034657987 | 8.86 |

D2x: a maximum dimension of the hole 4031 through which the optical axis 50 passes
D2y: a minimum dimension of the hole 4031 through which the optical axis 50 passes
A2$_x$: an area of a circle having a diameter of D2x
Δ S2: a difference between the area of the circle having the diameter of D2x and a cross sectional area of the hole 4031

The modulation transfer function diagram of the camera device at different F-numbers in Table 4 is similar to in Table 3, so the illustration is omitted.

Figure 6:
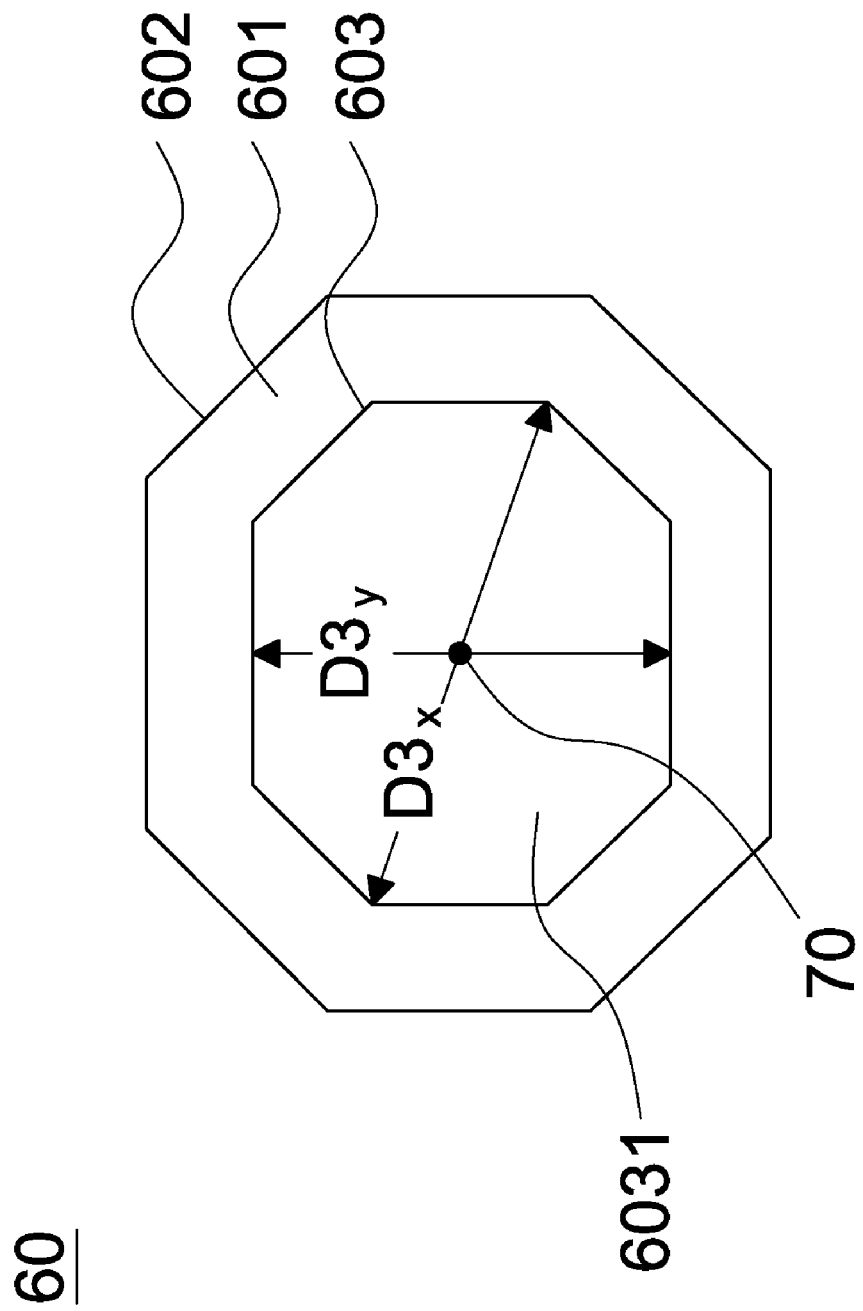
FIG. 6 is an annular body diagram of a camera device in accordance with a third embodiment of the invention.

As shown in FIG. 6, a camera device (not shown) in a third embodiment includes a plurality of lenses (not shown) and an annular body 60, which are arranged between an object side (not shown) and an image side (not shown) along an optical axis 70. The annular body 60 can be regarded as an annular shade, which will not be repeatedly emphasized hereinafter. The annular body 60 is disposed between the object side (not shown) and the plurality of lenses (not shown). The annular body 60 includes an annular main body 601, an outer circumferential portion 602, and an inner circumferential portion 603. The outer circumferential portion 602 and the inner circumferential portion 603 include eight straight edges respectively. The annular main body 601 connects to the outer circumferential portion 602 and the inner circumferential portion 603. The annular main body 601 is disposed between the outer circumferential portion 602 and the inner circumferential portion 603. The inner circumferential portion 603 is octagonal (non-circular) and surrounds the optical axis 70 to form a hole 6031. D3x is a maximum dimension of the hole 6031 defined by the inner circumferential portion 603 through which the optical axis 70 passes and D3y is a minimum dimension of the hole 6031 defined by the inner circumferential portion 603 through which the optical axis 70 passes. The hole 6031 allows the light rays from the object side (not shown) to pass through, and its dimension will affect the amount of the light rays passing through the camera device (not shown). Therefore, the main purpose of the annular body 60 is to work as an aperture. When the maximum dimension D3x of the hole 6031 is fixed, the annular body 60 will be flatter if the minimum dimension D3y which is smaller than the maximum dimension D3x is reduced. Therefore, if the flattened annular body 60 is included in a general lens assembly or a periscopic lens assembly, then the thickness of the lens assembly can be effectively reduced. The above camera device (not shown) may further includes a reflection device disposed between the object side (not shown) and the plurality of lenses (not shown), wherein the reflection device may be a prism or a reflection mirror.

Table 5 shows data for the camera device of the third embodiment of the invention, wherein f is fixed to 15 mm, D3x is fixed to 5.55 mm, and $A3_x$ is fixed to 24.1799625 mm², f is an effective focal length of the camera device (not shown), D3x is a maximum dimension of the hole 6031 defined by the inner circumferential portion 603 through which the optical axis 70 passes, D3y is a minimum dimension of the hole 6031 defined by the inner circumferential portion 603 through which the optical axis 70 passes, $A3_x$ is an area of a circle having a diameter of D3x and ΔS3 is a difference between the area of the circle having the diameter of D3x and a cross sectional area of the hole 6031. If D3y ranges from 5.55 mm to 0.5 mm, then F-number ranges from 2.71 to 8.53, D3x/D3y ranges from 1.0 to 11.1, (D3x−D3y)/(D3x/2) ranges from 0.0 to 1.81981982, ΔS3/(D3x/2) ranges from 0.065103604 mm to 7.840346847 mm, and ($A3_x$−ΔS3)/$A3_x$ ranges from 0.992528421 to 0.100206938.

TABLE 5

Effective focal Length = 15 mm
D3x = 5.55 mm
$A3_x$ = 24.1799625 mm²

| D3y (mm) | D3x/D3y | (D3x − D3y)/(D3x/2) | Hole Area (mm²) | Δ S3 (mm²) | Δ S3/(D3x/2) (mm) | ($A3_x$ − Δ S3)/$A3_x$ | F-number |
|---|---|---|---|---|---|---|---|
| 5.55 | 1.0 | 0.0 | 23.9993 | 0.1806625 | 0.065103604 | 0.992528421 | 2.71 |
| 5 | 1.11 | 0.198198198 | 22.5084 | 1.6715625 | 0.602364865 | 0.93086993 | 2.80 |
| 4.44 | 1.25 | 0.4 | 20.7599 | 3.4200625 | 1.232454955 | 0.85855799 | 2.91 |
| 4 | 1.3875 | 0.558558559 | 19.2229 | 4.9570625 | 1.786328829 | 0.794992962 | 3.03 |
| 2 | 2.775 | 1.279279279 | 9.418 | 14.7619625 | 5.319626126 | 0.389496055 | 4.33 |
| 1.33 | 4.172932331 | 1.520720721 | 6.367 | 17.8129625 | 6.419085586 | 0.263317199 | 5.26 |
| 1 | 5.55 | 1.63963964 | 4.852 | 19.3279625 | 6.965031532 | 0.200662015 | 6.03 |
| 0.8 | 6.9375 | 1.711711712 | 3.871 | 20.3089625 | 7.318545045 | 0.160091233 | 6.75 |
| 0.67 | 8.28358209 | 1.758558559 | 3.244 | 20.9359625 | 7.544490991 | 0.134160671 | 7.37 |
| 0.57 | 9.736842105 | 1.794594595 | 2.739 | 21.4409625 | 7.726472973 | 0.11327561 | 8.03 |
| 0.5 | 11.1 | 1.81981982 | 2.423 | 21.7569625 | 7.840346847 | 0.100206938 | 8.53 |

D3x: a maximum dimension of the hole 6031 through which the optical axis 70 passes D3y: a minimum dimension of the hole 6031 through which the optical axis 70 passes $A3_x$: an area of a circle having a diameter of D3x Δ S3: a difference between the area of the circle having the diameter of D3x and a cross sectional area of the hole 6031

Figure 7A:
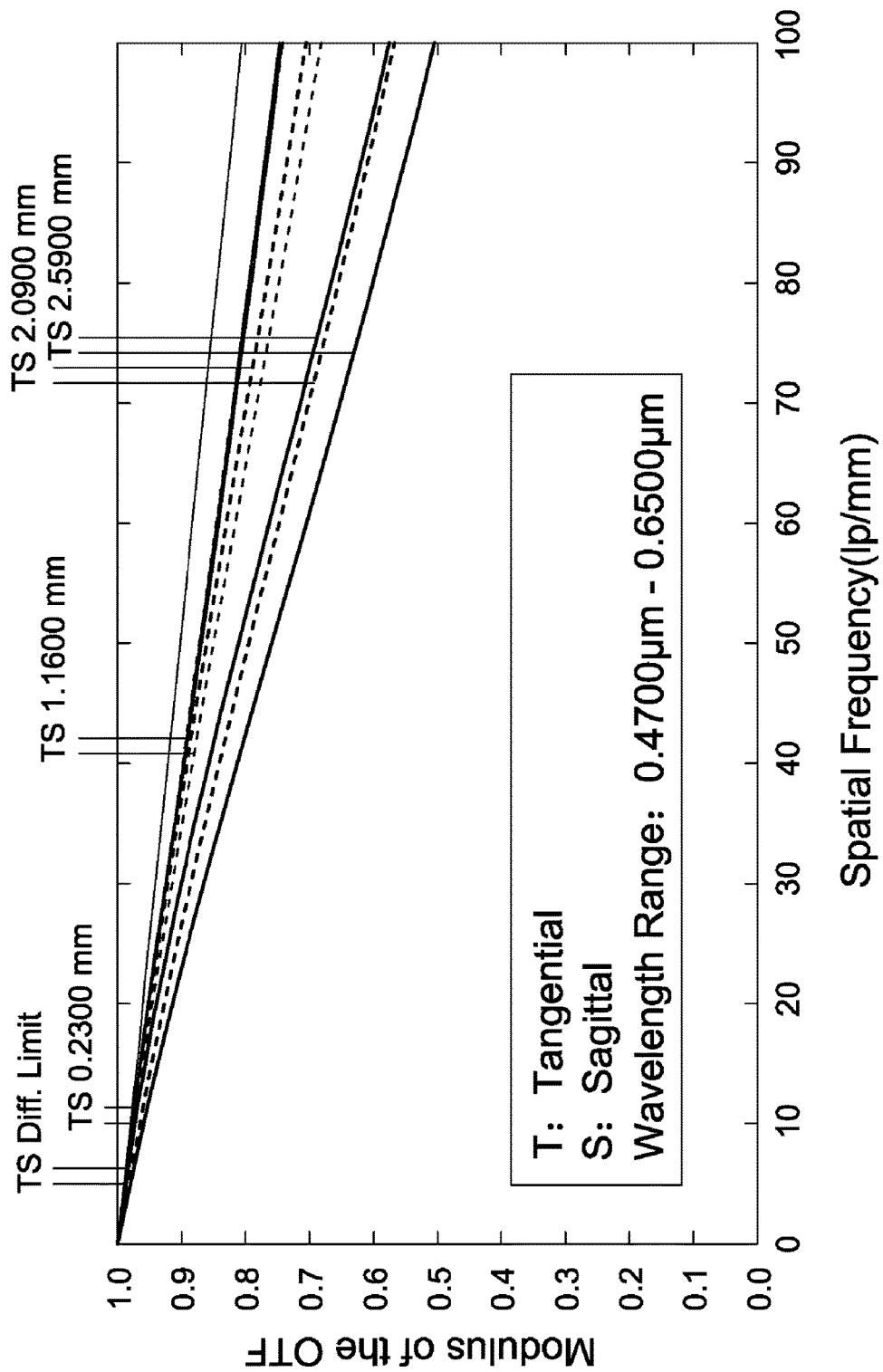
FIG. 7A is a modulation transfer function diagram of the camera device in Table 5 when F-number is equal to 2.71.
Figure 7B:
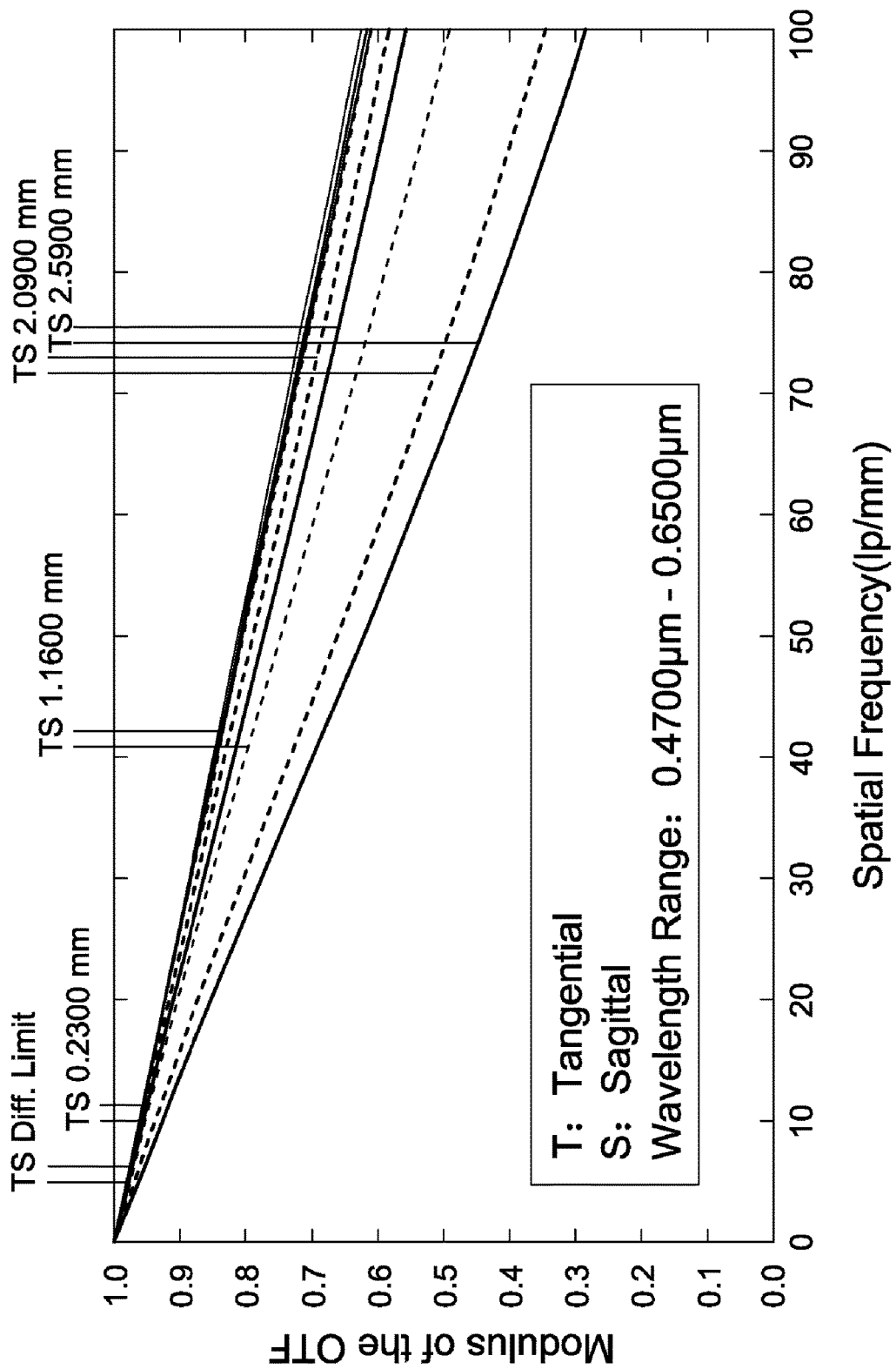
FIG. 7B is a modulation transfer function diagram of the camera device in Table 5 when F-number is equal to 5.26.
Figure 7C:
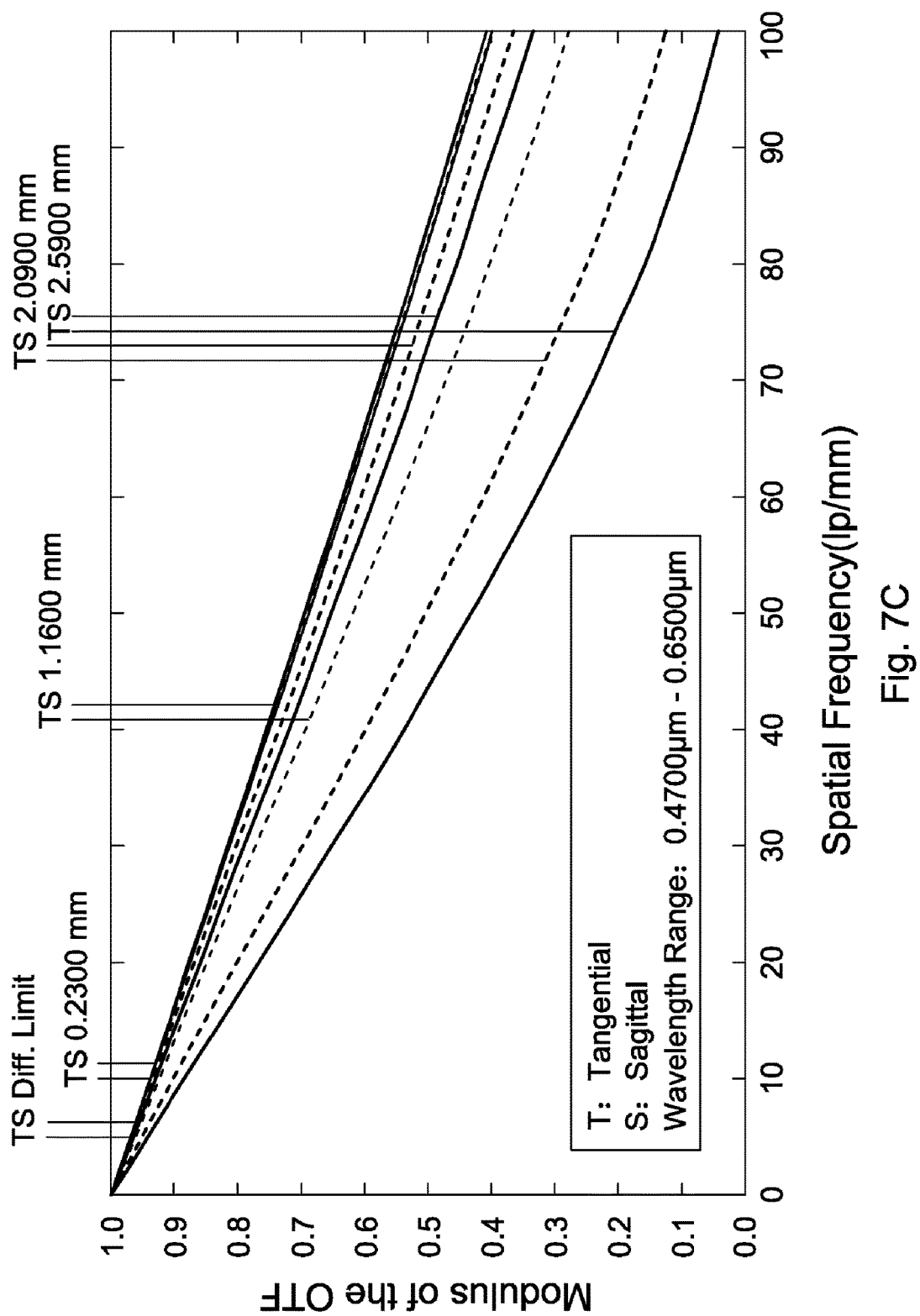
FIG. 7C is a modulation transfer function diagram of the camera device in Table 5 when F-number is equal to 8.53.

FIG. 7A shows the modulation transfer function diagram of the camera device in Table 5 when F-number is equal to 2.71. FIG. 7B shows the modulation transfer function diagram of the camera device in Table 5 when F-number is equal to 5.26. FIG. 7C shows the modulation transfer function diagram of the camera device in Table 5 when F-number is equal to 8.53.

Table 6 shows other data for the camera device of the third embodiment of the invention, wherein f is fixed to 5.09389 mm, D3x is fixed to 3.0872 mm, and $A3_x$ is fixed to 7.481681014 mm². If D3y ranges from 3.0872 mm to 0.112 mm, then F-number ranges from 1.67 to 8.28, D3x/D3y ranges from 1.0 to 27.56428571, (D3x−D3y)/(D3x/2) ranges from 0.0 to 1.927442343, ΔS3/(D3x/2) ranges from 0.133247612 mm to 4.654496641 mm, and $(A3_x-\Delta S3)/A3_x$ ranges from 0.972508716 to 0.039696961.

the outer circumferential portion 602 can be arbitrarily adjusted, which means that the interval between the outer circumferential portion 602 and the inner circumferential portion 603 may be any values greater than 0 without affecting the optical properties of the camera device, and should be within the scope of the invention.

In the second embodiment, the outer circumferential portion 402 and the inner circumferential portion 403 of FIG. 4 are different in shape. A horizontal interval Dh and a vertical interval Dv are defined between the outer circumferential portion 402 and the inner circumferential portion 403. When the shape and dimension of the inner circumferential portion 403 are fixed, the dimension of the outer circumferential portion 402 can be adjusted, which means that the horizontal interval Dh and the vertical interval Dv may be any values greater than 0, and the optical properties

TABLE 6

Effective focal Length = 5.09389 mm
D3x = 3.0872 mm
$A3_x$ = 7.481681014 mm²

| D3y (mm) | D3x/D3y | (D3x − D3y)/(D3x/2) | Hole Area (mm²) | Δ S3 (mm²) | Δ S3/(D3x/2) (mm) | $(A3_x - \Delta S3)/A3_x$ | F-number |
|---|---|---|---|---|---|---|---|
| 3.0872 | 1.0 | 0.0 | 7.276 | 0.205681014 | 0.133247612 | 0.972508716 | 1.67 |
| 2.234 | 1.381915846 | 0.552733869 | 5.952 | 1.529681014 | 0.990982777 | 0.795543139 | 1.84 |
| 1.11 | 2.781261261 | 1.280901788 | 2.816 | 4.665681014 | 3.022597185 | 0.376386001 | 2.68 |
| 0.744 | 4.149462366 | 1.518009847 | 1.953 | 5.528681014 | 3.581679849 | 0.261037593 | 3.22 |
| 0.56 | 5.512857143 | 1.637211713 | 1.469 | 6.012681014 | 3.895232583 | 0.196346249 | 3.72 |
| 0.44 | 7.016363636 | 1.71495206 | 1.137 | 6.344681014 | 4.11031421 | 0.151971194 | 4.23 |
| 0.372 | 8.298924731 | 1.759004924 | 0.936 | 6.545681014 | 4.240529292 | 0.125105574 | 4.66 |
| 0.32 | 9.6475 | 1.792692407 | 0.824 | 6.657681014 | 4.313086949 | 0.110135677 | 4.97 |
| 0.278 | 11.10503597 | 1.819901529 | 0.715 | 6.766681014 | 4.383701098 | 0.095566758 | 5.33 |
| 0.248 | 12.4483871 | 1.839336616 | 0.6342 | 6.847481014 | 4.436046265 | 0.084767046 | 5.66 |
| 0.22 | 14.03272727 | 1.85747603 | 0.5582 | 6.923481014 | 4.485281818 | 0.074608901 | 6.04 |
| 0.148 | 20.85945946 | 1.904120238 | 0.388 | 7.093681014 | 4.595543544 | 0.051860003 | 7.24 |
| 0.112 | 27.56428571 | 1.927442343 | 0.297 | 7.184681014 | 4.654496641 | 0.039696961 | 8.28 |

D3x: a maximum dimension of the hole 6031 through which the optical axis 70 passes
D3y: a minimum dimension of the hole 6031 through which the optical axis 70 passes
$A3_x$: an area of a circle having a diameter of D3x
Δ S3: a difference between the area of the circle having the diameter of D3x and a cross sectional area of the hole 6031

The modulation transfer function diagram of the camera device at different F-numbers in Table 6 is similar to in Table 5, so the illustration is omitted.

In each of the above embodiments, the annular body can be made of metal, polyethylene terephthalate (PET), or manufactured by atomizing, blacking or printing a non-effective-diameter region on any of the lenses.

In each of the above embodiments, the annular body is disposed between the object side and the plurality of lenses. However, it has the same effect and falls into the scope of the invention that the annular body is disposed between the plurality of lenses or between the plurality of lenses and the image side.

In the first embodiment, the outer circumferential portion 202 and the inner circumferential portion 203 of FIG. 2 are similar in shape. When the shape and the dimension of the inner circumferential portion 203 are fixed, the dimension of the outer circumferential portion 202 can be arbitrarily adjusted, which means that the interval between the outer circumferential portion 202 and the inner circumferential portion 203 may be any values greater than 0 without affecting the optical properties of the camera device, and should be within the scope of the invention.

In the third embodiment, the outer circumferential portion 602 and the inner circumferential portion 603 of FIG. 6 are similar in shape. When the shape and the dimension of the inner circumferential portion 603 are fixed, the dimension of of the camera device are not affected. During the adjustment of the vertical interval Dv, a preferred vertical interval of the outer circumferential portion 402 is between 0.112 mm and 5.55 mm, and at this time of the adjustment of the horizontal interval Dh, the ratio of the preferred horizontal interval to the preferred vertical interval of the outer circumferential portion 402 is between 1.1 and 27.6, which should be within the scope of the invention In the above embodiments, it is also possible to connect the annual body to any of the lenses of the plurality of lenses, so that any of the lenses of the plurality of lenses includes the annular body, and should be within the scope of the invention.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A camera device comprising:
   a plurality of lenses; and
   an annular body having a fixed stop;

wherein the plurality of lenses and the annular body are arranged between an object side and an image side along an optical axis;

wherein the annular body is disposed between the object side and the plurality of lenses, between the plurality of lenses, or between the plurality of lenses and the image side;

wherein the annular body comprises an annular main body, an outer circumferential portion, and an inner circumferential portion, the annular main body connects to the outer circumferential portion and the inner circumferential portion, the annular main body is disposed between the outer circumferential portion and the inner circumferential portion, and the inner circumferential portion is non-circular, having at least two straight parallel edges on opposing sides and other edges connecting the at least two parallel straight edges, and surrounds the optical axis to form the fixed stop;

wherein the camera device satisfies $Dx>Dy;$ $0 \text{ mm} < \Delta S/(Dx/2) < 8 \text{ mm};$ $0.198198198 \leq (Dx-Dy)/(Dx/2) < 2;$ where Dx is a maximum dimension of the fixed stop through which the optical axis passes, Dy is a minimum dimension of the fixed stop through which the optical axis passes, and ΔS is a difference between an area of a circle having a diameter of Dx and a cross sectional area of the fixed stop.

2. The camera device as claimed in claim 1, wherein the camera device satisfies:

$0<(Ax-\Delta S)/Ax<1,$ where Ax is the area of the circle having the diameter of Dx and ΔS is a difference between the area of the circle having the diameter of Dx and a cross sectional area of the fixed stop.

3. The camera device as claimed in claim 1, wherein the outer circumferential portion is non-circular.

4. The camera device as claimed in claim 1, wherein the annular body is made of metal or polyethylene terephthalate (PET).

5. The camera device as claimed in claim 1, wherein the annular body is manufactured by atomizing, blacking, or printing a non-effective-diameter region on one of the lenses.

6. The camera device as claimed in claim 1, wherein the camera device further satisfies:

$1<Dx/Dy<28.$

7. The camera device as claimed in claim 6, further comprising a reflection device disposed between the object side and the plurality of lenses.

8. The camera device as claimed in claim 7, wherein the reflection device is a prism or a reflection mirror.

9. A camera device, comprising a plurality of lenses, wherein:

at least one of the lenses comprises an annular shade having a fixed stop;

the annular shade comprises an annular main body, an outer circumferential portion, and an inner circumferential portion, wherein the annular main body connects to the outer circumferential portion and the inner circumferential portion, the annular main body is disposed between the outer circumferential portion and the inner circumferential portion, and the inner circumferential portion has at least two straight parallel edges on opposing sides and other edges connecting the at least two parallel straight edges, so as to form the fixed stop; and the camera device satisfies:

$0 \text{ mm} < \Delta S/(Dx/2) < 8 \text{ mm};$ $0.198198198 \leq (Dx-Dy)/(Dx/2) < 2;$ where Dx is a maximum dimension of the fixed stop through which an optical axis passes, Dy is a minimum dimension of the fixed stop through which the optical axis passes, and ΔS is a difference between an area of a circle having a diameter of Dx and a cross sectional area of the fixed stop.

10. The camera device as claimed in claim 9, wherein the outer circumferential portion is non-circular.

11. The camera device as claimed in claim 9, wherein the camera device satisfies:

$0<(Ax-\Delta S)/Ax<1,$ where Ax is the area of the circle having the diameter of Dx.

12. The camera device as claimed in claim 11, wherein the outer circumferential portion is non-circular.

13. The camera device as claimed in claim 12, wherein the outer circumferential portion includes at least one straight edge.

14. The camera device as claimed in claim 13, wherein the outer circumferential portion is polygonal.

15. The camera device as claimed in claim 11, wherein the inner circumferential portion includes at least one straight edge.

16. The camera device as claimed in claim 15, wherein the inner circumferential portion is polygonal.

* * * * *